United States Patent
Choquet et al.

(10) Patent No.: US 11,703,183 B2
(45) Date of Patent: Jul. 18, 2023

(54) SYSTEM FOR LUBRICATING A SEALED BEARING AND ASSOCIATED METHOD

(71) Applicant: Aktiebolaget SKF, Gothenburg (SE)

(72) Inventors: Eric Choquet, Guilion (FR); Eric Robba, Domecy sur Cure (FR)

(73) Assignee: Aktiebolaget SKF, Gothenburg (SE)

(*) Notice: Subject to any disclaimer, the term of this patent is extended or adjusted under 35 U.S.C. 154(b) by 81 days.

(21) Appl. No.: 17/379,211

(22) Filed: Jul. 19, 2021

(65) Prior Publication Data
US 2022/0074451 A1    Mar. 10, 2022

(30) Foreign Application Priority Data
Sep. 8, 2020    (DE) .................. 102020211264.9

(51) Int. Cl.
*F16N 31/00*    (2006.01)
*F16N 29/02*    (2006.01)
(Continued)

(52) U.S. Cl.
CPC .............. *F16N 31/00* (2013.01); *F16N 7/40* (2013.01); *F16N 13/00* (2013.01); *F16N 29/02* (2013.01);
(Continued)

(58) Field of Classification Search
CPC .......... F16N 31/00; F16N 13/00; F16N 29/02; F16N 2210/14; F16N 2250/04; F16N 2270/60
(Continued)

(56) References Cited

U.S. PATENT DOCUMENTS

| 5,001,805 A | * | 3/1991 | Stouky | F01M 11/045 |
| | | | | 15/302 |
| 6,170,611 B1 | * | 1/2001 | Daly | F16N 7/385 |
| | | | | 184/6.14 |

(Continued)

FOREIGN PATENT DOCUMENTS

| CA | 2886704 C | | 6/2019 |
| CN | 110513594 | * | 11/2019 |
| GB | 286019 A | | 3/1928 |

OTHER PUBLICATIONS

CN110513594—English translation—Nov. 2019.*

*Primary Examiner* — Michael R Mansen
*Assistant Examiner* — Mark K Buse
(74) *Attorney, Agent, or Firm* — Garcia-Zamor Intellectual Property Law, LLC; Ruy Garcia-Zamor

(57) ABSTRACT

A method for lubricating a sealed bearing providing a first ring and a second ring capable of rotating concentrically relative to one another, and seals delimiting together with the first and second rings a sealed chamber. The method includes a removing a first predetermined quantity of lubricant from the sealed chamber until the pressure in the sealed chamber reaches a first pressure value, and then injecting a second predetermined quantity of lubricant in the sealed chamber until the pressure in the sealed chamber reaches a second pressure value, the first pressure value and the second pressure value being determined so that the pressure inside the sealed chamber remains within a predetermined interval, the boundaries of the interval being determined according to characteristics of the seals so that the sealed chamber remains waterproof to the lubricant when lubricant is removed from or injected in the sealed chamber.

20 Claims, 4 Drawing Sheets

(51) Int. Cl.
 *F16N 13/00* (2006.01)
 *F16N 7/40* (2006.01)
(52) U.S. Cl.
 CPC ...... *F16N 2210/14* (2013.01); *F16N 2250/04* (2013.01); *F16N 2270/60* (2013.01)
(58) Field of Classification Search
 USPC .......................................................... 184/7.4
 See application file for complete search history.

(56) References Cited

U.S. PATENT DOCUMENTS

| | | | | |
|---|---|---|---|---|
| 10,088,100 | B2* | 10/2018 | Kreutzkaemper | F16N 7/40 |
| 2003/0115977 | A1* | 6/2003 | Holweg | F16C 19/52 |
| | | | | 702/113 |
| 2005/0183906 | A1* | 8/2005 | Misu | F16N 7/14 |
| | | | | 184/7.4 |
| 2013/0168188 | A1* | 7/2013 | Donovan | F16N 7/38 |
| | | | | 184/6 |
| 2015/0308505 | A1* | 10/2015 | Onoda | F16C 29/005 |
| | | | | 184/6 |
| 2016/0186811 | A1* | 6/2016 | Conley | F16C 33/6607 |
| | | | | 184/6.1 |
| 2019/0309900 | A1* | 10/2019 | Tanaka | F16N 21/04 |
| 2021/0180615 | A1* | 6/2021 | Hove | F01M 11/045 |
| 2021/0332944 | A1* | 10/2021 | Madsen | F16C 33/102 |

* cited by examiner

SYSTEM FOR LUBRICATING A SEALED BEARING AND ASSOCIATED METHOD

CROSS-REFERENCE TO RELATED APPLICATIONS

This application claims priority to German Patent Application no. 102020211264.9, filed Sep. 8, 2020, the contents of which is fully incorporated herein by reference.

TECHNICAL FIELD

The present invention relates to sealed bearings, and more particularly to systems for lubricating sealed bearings and methods for implementing such systems.

BACKGROUND OF THE INVENTION

Generally, a sealed bearing comprises a first ring and a second ring capable of rotating concentrically relative to one another.

FIG. 1 illustrates an example of a prior art sealed bearing 1 comprising a first ring 2 and a second ring 3.

The first ring 2 comprises a first opening 4 and the second ring 3 comprises a second opening 5 as will be described later.

FIG. 2 illustrates a partial cross-section of the prior art sealed bearing 1.

The first ring 2 comprises two grooves 6, 7 and the second ring 3 comprises two grooves 8, 9.

Seals 10, 11 are inserted in the grooves 6, 7 of the first ring 2 so that a lip of the seals 10, 11 rubs on the second ring 3, and seals 12, 13 are inserted in the grooves 8, 9 of the second ring 3 so that a lip of the seals 12, 13 rubs on the first ring 2.

The sealed bearing 1 also comprises a row of rolling elements 14, which are provided here in the form of balls, mounted between the first and second rings 2, 3. The rolling bearing further comprises a cage 15 for maintaining the regular circumferential spacing of the rolling elements 14.

The seals 10, 11, 12 and 13, the first ring 2 and the second ring 3 form a sealed chamber 16.

The sealed chamber 16 contains generally a lubricant, usually grease, to facilitate the concentrically rotation from one ring to the other one.

The lubricant in the sealed chamber needs to be regularly changed during regreasing operations.

Before adding some fresh lubricant in the sealed bearing, worn lubricant placed originally or during previous regreasing operations is removed from the sealed chamber Removal of worn lubricant is generally performed by suction with a pump generating a depression in the sealed chamber 16, the pump being connected to the first or second opening 4, 5 of the first and second rings and communicating with the sealed chamber 16.

If the depression generated in the sealed chamber is too high, the lips of the seals 10, 11, 12, 13 in the grooves of the first and second rings 2, 3 may move so that the sealed chamber is no longer waterproof, lubricant escaping from the sealed chamber or the seals 10, 11, 12, 13 may leave their groove.

Fresh lubricant is introduced into the sealed chamber for example with a pump connected to the other opening 4, 5 communicating with the sealed chamber 16. If the overpressure generated by the pump in the sealed chamber is too high, the lips of the seals can move during adding some fresh lubricant operation leading also to a no waterproof sealed bearing.

Depending on the applications of the sealed bearing, for example for agrifood applications, it is not allowed that lubricant escape from the sealed bearing.

One solution to reduce the depression is to perform a suction at low pressure.

However, the worn lubricant, especially grease, is difficult to remove and the removing operation of grease is very slow.

The U.S. Pat. No. 10,088,100 B2 discloses a lubricating system for a bearing including a first pumping device configured to introduce a first quantity of lubricant into the bearing, a second pumping device configured to remove a second quantity of lubricant from the bearing, and a controlling device configured to activate the first pumping device and the second pumping device interdependently with each other.

However, the depression and overpressure generated in the bearing is not controlled so that the seals or lips of seals may move leading to a not waterproof to the lubricant sealed bearing.

The document CA2886704 discloses a method for removing old grease from a wind turbine main bearing.

The method comprises spraying a cleaning fluid in the bearing to remove grease and pumping the cleaning fluid and removed worn grease out of the bearing, the cleaning fluid being used to dissolve the worn grease.

However, the method is complex to implement, is time consuming and requires to spray the additional cleaning fluid.

There is a need to avoid at least some of the previously-mentioned drawbacks, especially by removing worn lubricant from and introducing fresh lubricant into a sealed bearing in a simple way so that the sealed bearing remains waterproof to the lubricant and during a reduce duration.

SUMMARY OF THE INVENTION

According to an aspect, a method for lubricating a sealed bearing comprising a first ring and a second ring capable of rotating concentrically relative to one another, and seals delimiting together with the first and second rings a sealed chamber is proposed.

The method comprises:

a) a first step of removing a first predetermined quantity of lubricant from the sealed chamber until the pressure in the sealed chamber reaches a first pressure value, and b) a second step of injecting a second predetermined quantity of lubricant in the sealed chamber until the pressure in the sealed chamber reaches a second pressure value, the first pressure value and the second pressure value being determined so that the pressure inside the sealed chamber remains within a predetermined interval, the boundaries of the interval being determined according to characteristics of the seals so that the sealed chamber remains waterproof to the lubricant when lubricant is removed from or injected in the sealed chamber.

The pressure inside the sealed chamber is controlled which avoids that the seals may leave their groove or that the lips of the seals may move so that the sealed chamber remains waterproof to the lubricant, no lubricant being escaping from the sealed bearing.

The first and second predetermined quantity of lubricant may be equal or different.

The lubricant is for example grease or oil.

Advantageously, injecting the predetermined quantity of lubricant comprises pressurizing a fluid and spraying the lubricant in the sealed chamber with the pressurized fluid.

Preferably, injecting the predetermined quantity of lubricant comprises activating a feed pumping device configured to introduce the quantity of lubricant in the sealed chamber.

Advantageously, the first step a) and the second step b) are repeated.

Preferably, the first predetermined quantity of lubricant and the second predetermined quantity of lubricant are equal.

According to another aspect, a system for lubricating a sealed bearing comprising a first ring and a second ring capable of rotating concentrically relative to one another, and seals delimiting together with the first and second rings a sealed chamber is proposed.

The system comprises:

a removing device configured to remove a first predetermined quantity of lubricant from the sealed chamber until the pressure in the sealed chamber reaches a first pressure value, and an injecting device configured to inject a second predetermined quantity of lubricant in the sealed chamber until the pressure in the sealed chamber reaches a second pressure value, the first pressure value and the second pressure value being determined so that the pressure inside the sealed chamber remains within a predetermined interval, the boundaries of the interval being determined according to characteristics of the seals so that the sealed chamber remains waterproof to the lubricant when lubricant is removed from the sealed chamber and injected in the sealed chamber.

Preferably, the removing device comprises a depression pump configured to suck lubricant from the sealed chamber.

Advantageously, the removing device further comprises a pressure sensor configured to measure the pressure in the sealed chamber and a controller configured to activate the depression pump until the measured pressure reached the first pressure value.

Preferably, the injecting device comprises a feed pump configured to introduce the predetermined quantity of lubricant in the sealed chamber.

Advantageously, the injecting device further comprises a pressure sensor configured to measure the pressure in the sealed chamber and a controller configured to activate the feed pump until the measured pressure reached the second pressure value.

BRIEF DESCRIPTION OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
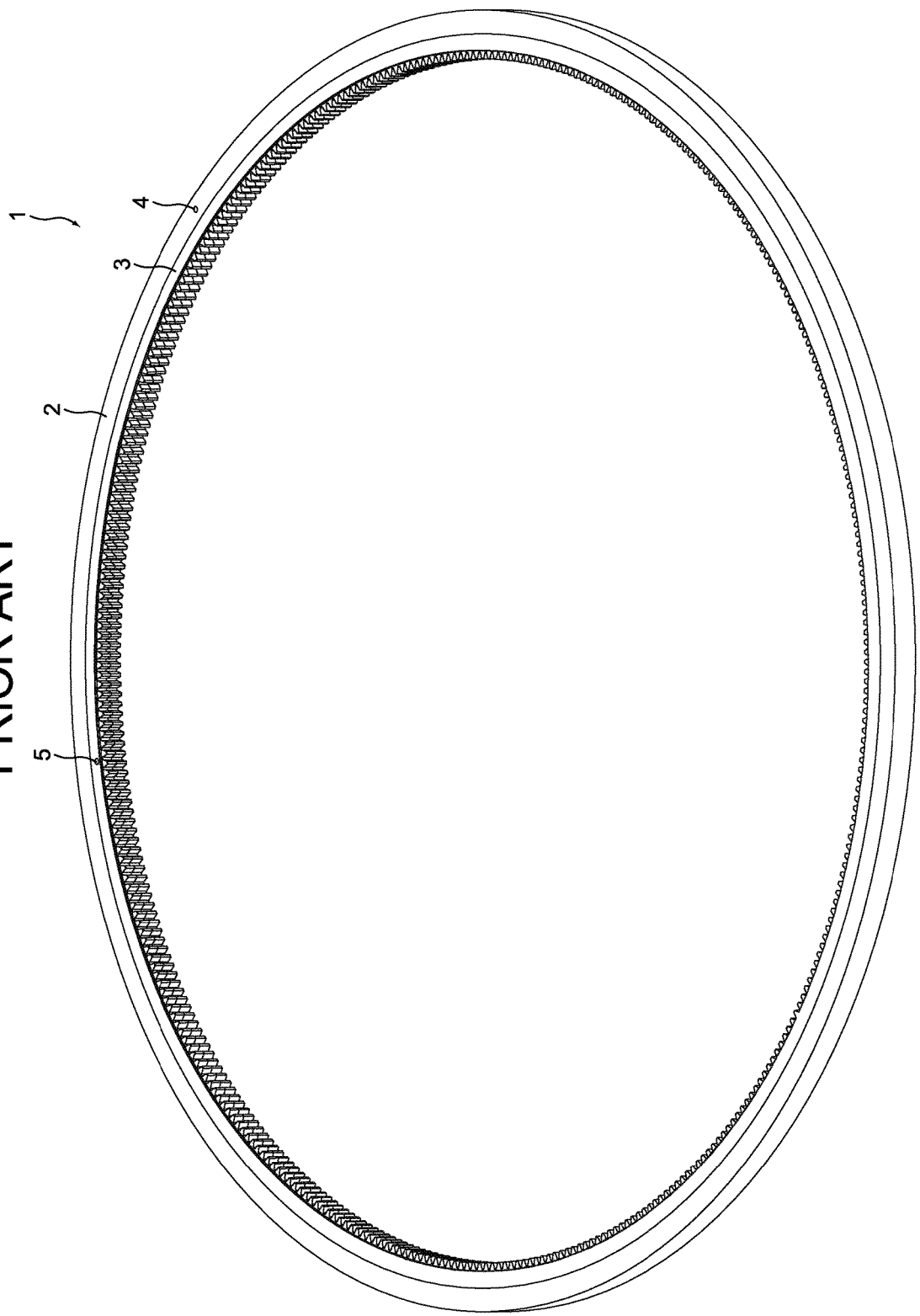
FIG. 1 and FIG. 2 illustrate schematically a sealed bearing according to the prior art.
Figure 2:
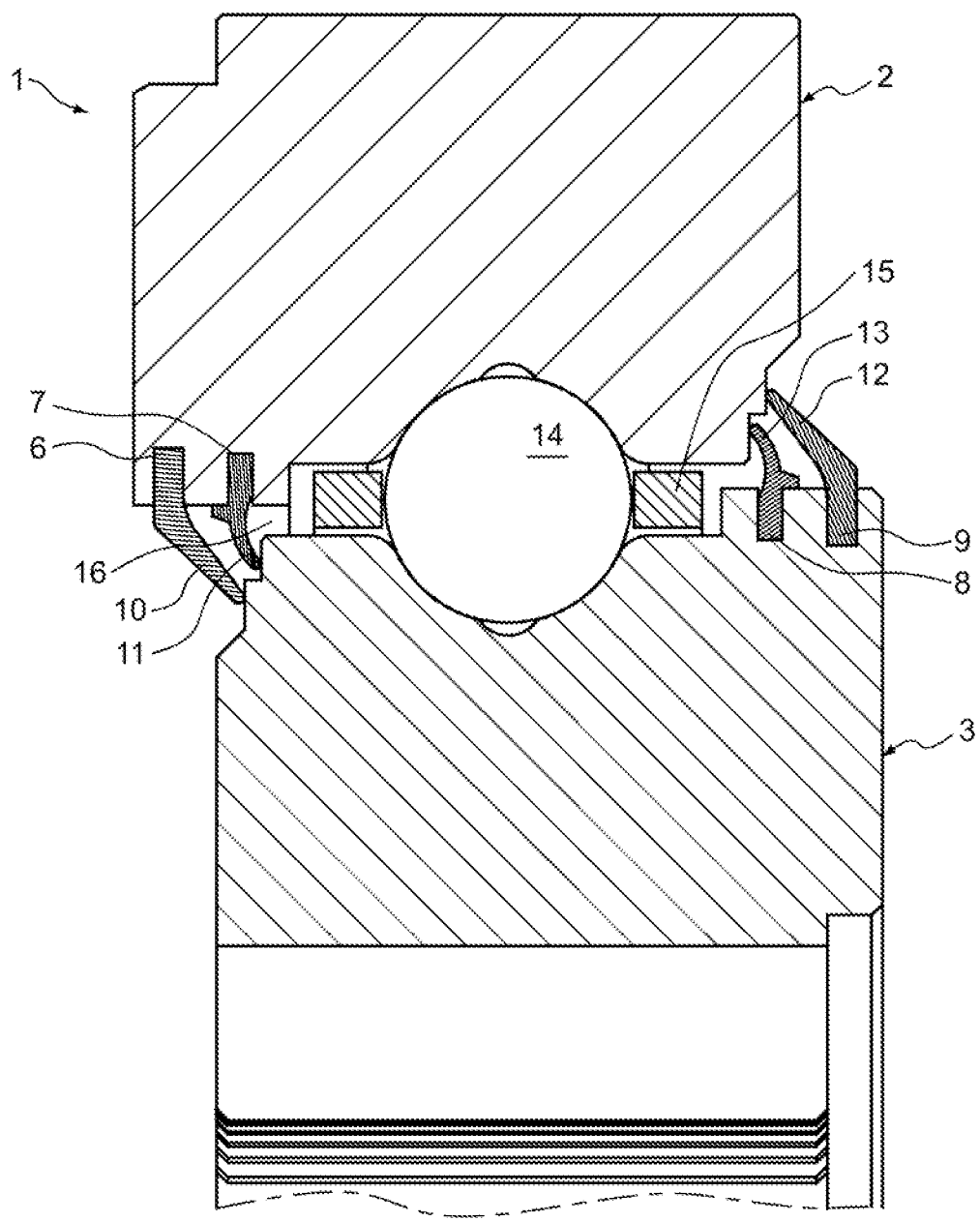
Figure 3:
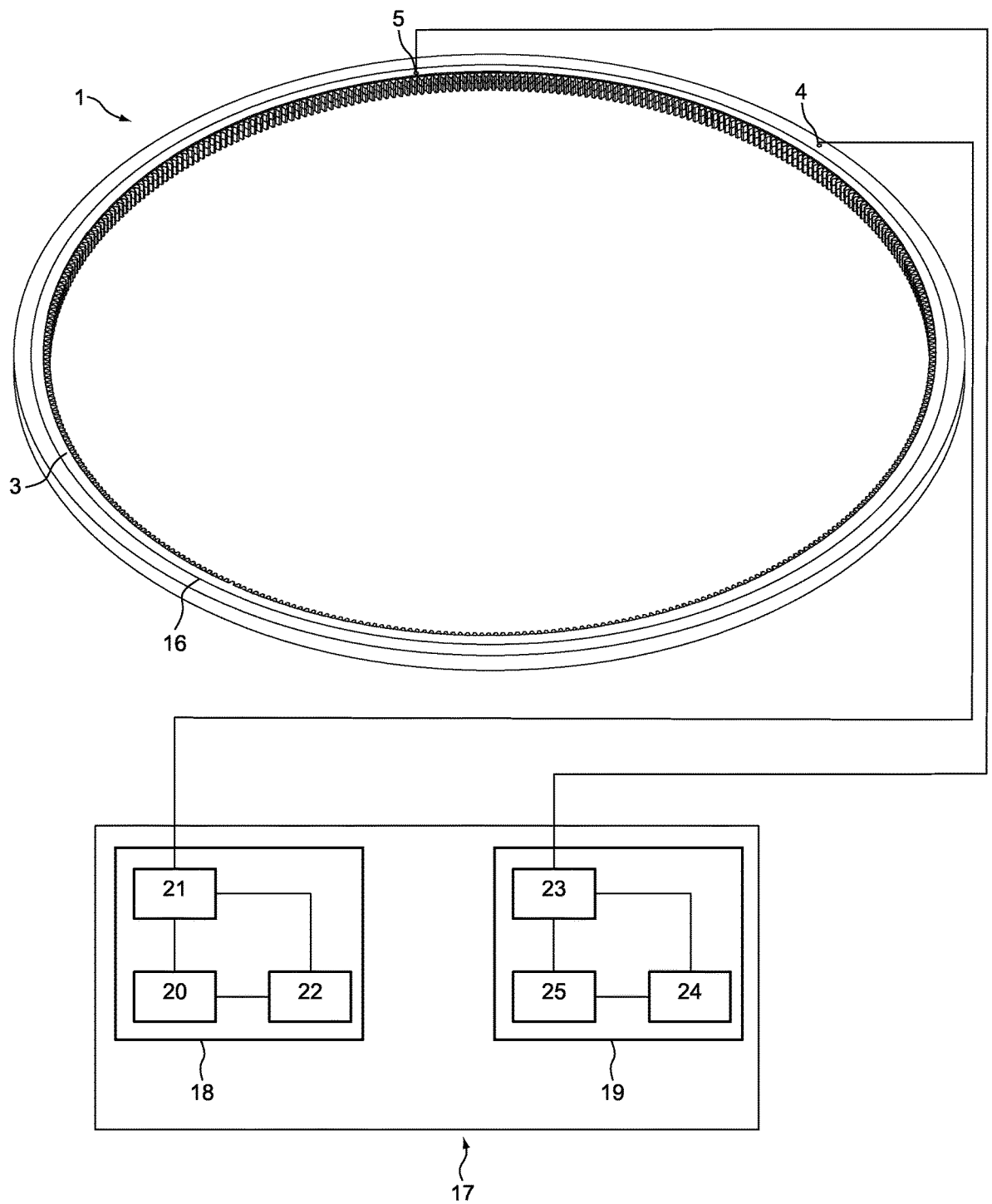
FIG. 3 illustrates schematically an embodiment of a system for lubricating a sealed bearing according to the invention.

Reference is made to FIG. 3 which represents the sealed bearing 1 and an example of embodiment of a system 17 for lubricating the sealed bearing 1 connected to the first opening 4 and the second opening 5.

The system 17 comprises a removing device 18 removing a first predetermined quantity of lubricant from the sealed chamber 16 until the pressure in the sealed chamber reaches a first pressure value P1, and an injecting device 19 configured to inject a second predetermined quantity of lubricant in the sealed chamber 16 until the pressure in the sealed chamber reaches a second pressure value P2.

The lubricant is for example grease.

The first and second predetermined quantity of lubricant may be equal or different.

For example, for a 2.8 m diameter sealed bearing, the quantity of lubricant contained in the sealed chamber 16 is equal to 3.7 kg of grease, the first and second predetermined quantity of lubricant may be equal to 3.7 kg if the grease is renewed in full.

For example, the removing device 18 is connected to the second opening 5 and the injecting device 19 is connected to the first opening 4.

Alternatively, the removing device 18 may be connected to the first opening 4 and the injecting device 19 is connected to the second opening 5.

If the sealed bearing 1 comprises an inspection hole used to collect a small quantity of lubricant for analysis, the removing device 18 may be connected to the inspection hole.

The first pressure P1 and the second pressure P2 are determined so that the pressure inside the sealed chamber 16 remains within a predetermined interval, the boundaries of the interval being determined according to characteristics of the seals 10, 11, 12, 13 so that the seals chamber 16 remains waterproof to the lubricant when lubricant is removed from the sealed chamber 16 and lubricant is injected in the sealed chamber 16.

The characteristics of the seals 10, 11, 12, 13 taking into account to determine the boundaries of the interval comprise for example the geometry and/or the material in which the seals are made of and/or the anchorage of the seals into the rings 2, 3, the anchorage of the seals into the rings 2, 3 being characterized for example by the form and/or the dimensions of the seal heels.

For example, the interval ranges from 0.5 bar to 1.8 bar.

The removing device 18 comprises for example a depression pump 20 connected to the first opening 4, a first pressure sensor 21 measuring the pressure in the sealed chamber 16 and a first controller 22.

The depression pump 20 removes the first predetermined quantity of worn lubricant from the sealed chamber 16.

The injecting device 19 comprises for example a feed pump 23 configured to introduce the second predetermined quantity of fresh lubricant in the sealed chamber 16, a second pressure sensor 24 measuring the pressure in the sealed chamber 16 and a second controller 25.

An example of an embodiment of a method for lubricating the sealed bearing 1 is disclosed.

In a first step, the first predetermined quantity of worn lubricant is removed from the sealed chamber 16 until the pressure in the sealed chamber reaches the first pressure value P1.

The first controller 22 powers the depression pump 20 until the first pressure sensor 21 measures a pressure value equal to the first pressure value P1.

Then the depression pump 20 is stopped.

In a second step, the second predetermined quantity of lubricant is injected in the sealed chamber 16 until the pressure in the sealed chamber 16 reaches the second pressure value P2.

The second controller 25 powers the feed pump 23 until the second pressure sensor 24 measures a pressure value equal to the second pressure value P2.

Then the feed pump 23 is stopped.

In another embodiment (not represented), a fluid is pressurized and fresh lubricant is sprayed in the sealed chamber with the pressurized fluid.

Alternatively, the second step is performed before the first step.

In another embodiment the first step and the second step are repeated until the first predetermined quantity of lubricant is removed from the sealed chamber 16 and the second predetermined quantity of lubricant is injected in the seal chamber 16.

The system 17 may be permanently connected to the sealed bearing 1 or may be removed after the regreasing operation.

In this case, plugs close the first and second openings 4, 5 when the system 17 is not connected to the sealed bearing 1.

The first pressure sensor 21 may be embedded in the depression pump 20 and the second pressure sensor 24 may be embedded in the feed pump 23.

Figure 4:
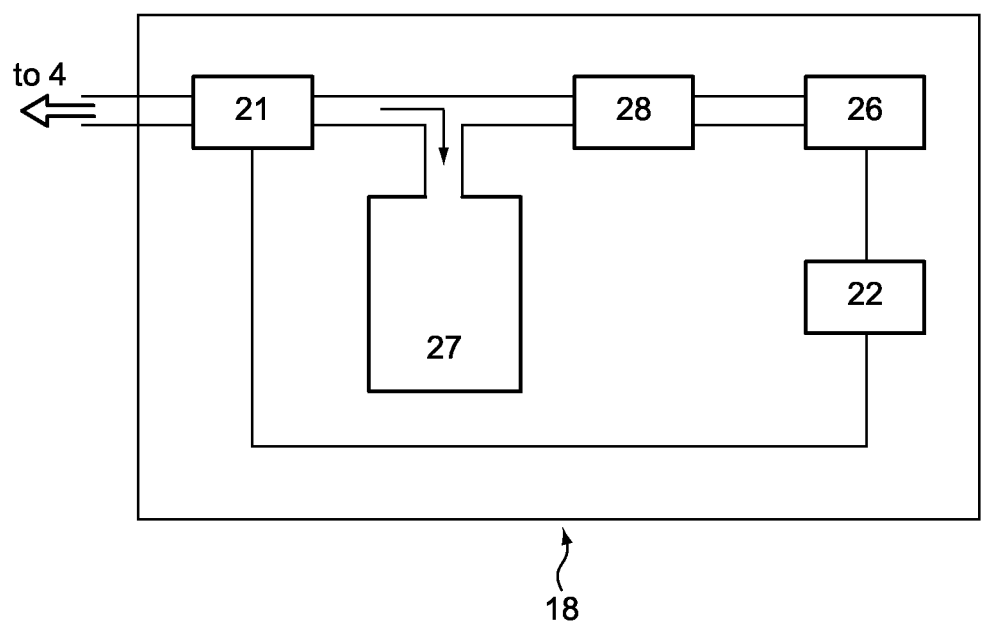
FIG. 4 illustrates a second embodiment of the removing device.

FIG. 4 represents a second embodiment of the removing device 18.

The removing device 18 comprises a depression pump 26 powered by the first controller 22 and the first pressure sensor 21.

The removing device 18 further comprises a container 27 connected to a depression pump 26 through a lubricant retaining means 28 and to the first opening 4.

The retaining means 28 may be for example a valve or a filter to avoid that the depression pump 26 absorbs the lubricant, the depression pump 26 being not configured to absorb the lubricant.

When the depression pump 26 is powered by the first controller 22, the removed lubricant flows into the container 27 as illustrated by the arrow.

In the illustrated example, the sealed bearing unit is provided with rolling elements 14 comprising one row of rolling elements. Alternatively, the rolling bearing may comprise at least two rows of rolling elements. In the illustrated example, the rolling elements are balls. Alternatively, the rolling bearing may comprise other types of rolling elements, for example rollers. In another variant, the rolling bearing may also be provided with a sliding bearing having no rolling elements.

In the illustrated example, the removing device 18 and the injecting device 19 are controlled by the first and second controllers 22, 25. Alternatively, the removing device 18 and the injecting device 19 comprises handpumps instead of the pumps 20, 23, the injecting and removing pressures of lubricant in the sealed chamber being controlled by an operator operating the handpumps.

The sealed bearing 1 comprises four seals 10, 11, 12 and 13. Alternatively, the sealed bearing 1 may comprise a different number of seals, for example only two seals so that the two seals, the first ring 2 and the second ring 3 form the sealed chamber 16.

In another embodiment, all the seals are mounted on the same ring 2, 3.

The method for lubricating the sealed bearing 1 needs no additional cleaning fluid.

Removing the worn lubricant from the sealed chamber and filling the sealed chamber with fresh lubricant may be done least partly at the same time so that the regreasing operation duration is reduced.

The pressure inside the sealed chamber is controlled which avoids to damage the components inside the sealing chamber due to excessive high or low pressure, and avoid that the seals may leave their groove or that the lips of the seals may move so that the sealed chamber remains waterproof to the lubricant, no lubricant being escaping from the sealed bearing.

The invention claimed is:

1. A method for lubricating a sealed bearing comprising:
   providing a first ring and a second ring capable of rotating concentrically relative to one another, and seals delimiting together with the first and second rings a sealed chamber, a pressure inside the sealed chamber being within a predetermined interval between a first lower pressure value and a second higher pressure value, the seals being configured such that while the pressure remains within the predetermined interval, the sealed chamber remains resistant to leaks,
   establishing fluid communication between the sealed chamber and a pump and removing up to a first predetermined quantity of lubricant from the sealed chamber provided that the pressure in the sealed chamber does not go below a first lower pressure value, and
   injecting up to a second predetermined quantity of lubricant in the sealed chamber provided that the pressure in the sealed chamber does not exceed a second higher pressure value, wherein lubricant is removed from or injected in the sealed chamber via a device including the pump which is configured to suck lubricant from the sealed chamber, wherein the device comprises a pressure sensor configured to measure the pressure in the sealed chamber and a controller configured to activate the pump provided the measured pressure is within the predetermined interval.

2. The method according to claim 1, wherein injecting the first predetermined quantity of lubricant comprises inserting the device through a first opening located on the sealed bearing and using the pump to inject the lubricant into the sealed chamber.

3. The method according to claim 1, wherein injecting the first predetermined quantity of lubricant comprises activating a feed pumping device configured to introduce the quantity of lubricant in the sealed chamber.

4. The method according to claim 1, wherein the method is repeated.

5. The method according to claim 1, wherein the first predetermined quantity of lubricant and the second predetermined quantity of lubricant are equal.

6. The method of claim 1, wherein the predetermined interval is 0.5-1.8 bar.

7. The method of claim 1, wherein injecting up to the second predetermined quantity of lubricant is done via a feed pump including a second pressure sensor.

8. The method of claim 1, wherein the method is performed by a system permanently connected to the sealed bearing.

9. A system for lubricating a sealed bearing comprising:
   a first ring and a second ring capable of rotating concentrically relative to one another, and seals delimiting together with the first and second rings a sealed chamber, a pressure inside the sealed chamber being within a predetermined interval between a first lower pressure value and a second higher pressure value, the seals being configured such that while the pressure remains within the predetermined interval, the sealed chamber remains resistant to leaks, a removing device configured to establish fluid connection between the sealed chamber and a pump and to remove up to a first predetermined quantity of lubricant from the sealed chamber provided that the pressure in the sealed chamber does not go below a first lower pressure value, wherein the removing device comprises a pressure sensor configured to measure the pressure in the sealed chamber and a controller configured to activate the pump provided the measured pressure is within the predetermined interval, and an injecting device configured to inject up to a second predetermined quantity of lubricant in the sealed chamber provided that the pressure in the sealed chamber does not exceed a second higher pressure value, wherein lubricant is removed from the sealed chamber and injected in the sealed chamber via one of the injecting device or the removing device, the removing device being configured to suck lubricant from the sealed chamber.

10. The system of claim 9, wherein the predetermined interval is 0.5-1.8 bar.

11. The system of claim 9, wherein the injecting device further comprises a feed pump including a second pressure sensor and the removing device further comprises a feed pump including a second pressure sensor.

12. The system of claim 9, wherein the system is permanently connected to the sealed bearing.

13. A method for lubricating a sealed bearing comprising:
providing a first ring and a second ring capable of rotating concentrically relative to one another, and seals delimiting together with the first and second rings a sealed chamber, a pressure inside the sealed chamber being within a predetermined interval between a first lower pressure value and a second higher pressure value, the seals being configured such that while the pressure remains within the predetermined interval, the sealed chamber remains resistant to leaks, removing up to a first predetermined quantity of lubricant from the sealed chamber provided that the pressure in the sealed chamber does not go below a first lower pressure value, and establishing fluid communication between the sealed chamber and a pump and injecting up to a second predetermined quantity of lubricant in the sealed chamber provided that the pressure in the sealed chamber does not exceed a second higher pressure value wherein lubricant is removed from or injected in the sealed chamber via a device including the pump which is configured to inject lubricant into the sealed chamber, wherein the device further comprises a pressure sensor configured to measure the pressure in the sealed chamber and a controller configured to activate the pump provided the measured pressure is within the predetermined interval.

14. The method of claim 13, wherein the predetermined interval is 0.5-1.8 bar.

15. The method of claim 13, wherein removing up to the first predetermined quantity of lubricant is done via a depression pump including a first pressure sensor.

16. The method of claim 13, wherein the method is performed by a system permanently connected to the sealing bearing.

17. A system for lubricating a sealed bearing comprising:
a first ring and a second ring capable of rotating concentrically relative to one another, and seals delimiting together with the first and second rings a sealed chamber, a pressure inside the sealed chamber being within a predetermined interval between a first lower pressure value and a second higher pressure value, the seals being configured such that while the pressure remains within the predetermined interval, the sealed chamber remains resistant to leaks, a removing device configured to remove up to a first predetermined quantity of lubricant from the sealed chamber provided that the pressure in the sealed chamber does not go below a first lower pressure value, wherein the removing device comprises a pressure sensor configured to measure the pressure in the sealed chamber and a controller configured to activate the pump provided the measured pressure is within the predetermined interval, and an injecting device configured to establish fluid connection between the sealed chamber and a pump and to inject up to a second predetermined quantity of lubricant in the sealed chamber provided that the pressure in the sealed chamber does not exceed a second higher pressure value, wherein the injecting device further comprises a pressure sensor configured to measure the pressure in the sealed chamber and a controller configured to activate the pump provided the measured pressure is within the predetermined level, wherein lubricant is removed from the sealed chamber and injected in the sealed chamber via one of the injecting device or the removing device, the injecting device being configured to inject lubricant into the sealed chamber.

18. The system of claim 17, wherein the predetermined interval is 0.5-1.8 bar.

19. The system of claim 17, wherein the injecting device further comprises a depression pump including a second pressure sensor and the removing device further comprises a feed pump including a first pressure sensor.

20. The system of claim 17, wherein the system is permanently connected to the sealed bearing.

* * * * *